March 12, 1963 E. ABBONIZIO ETAL 3,080,935
HOISTING AND WEIGHING APPARATUS
Filed March 2, 1959
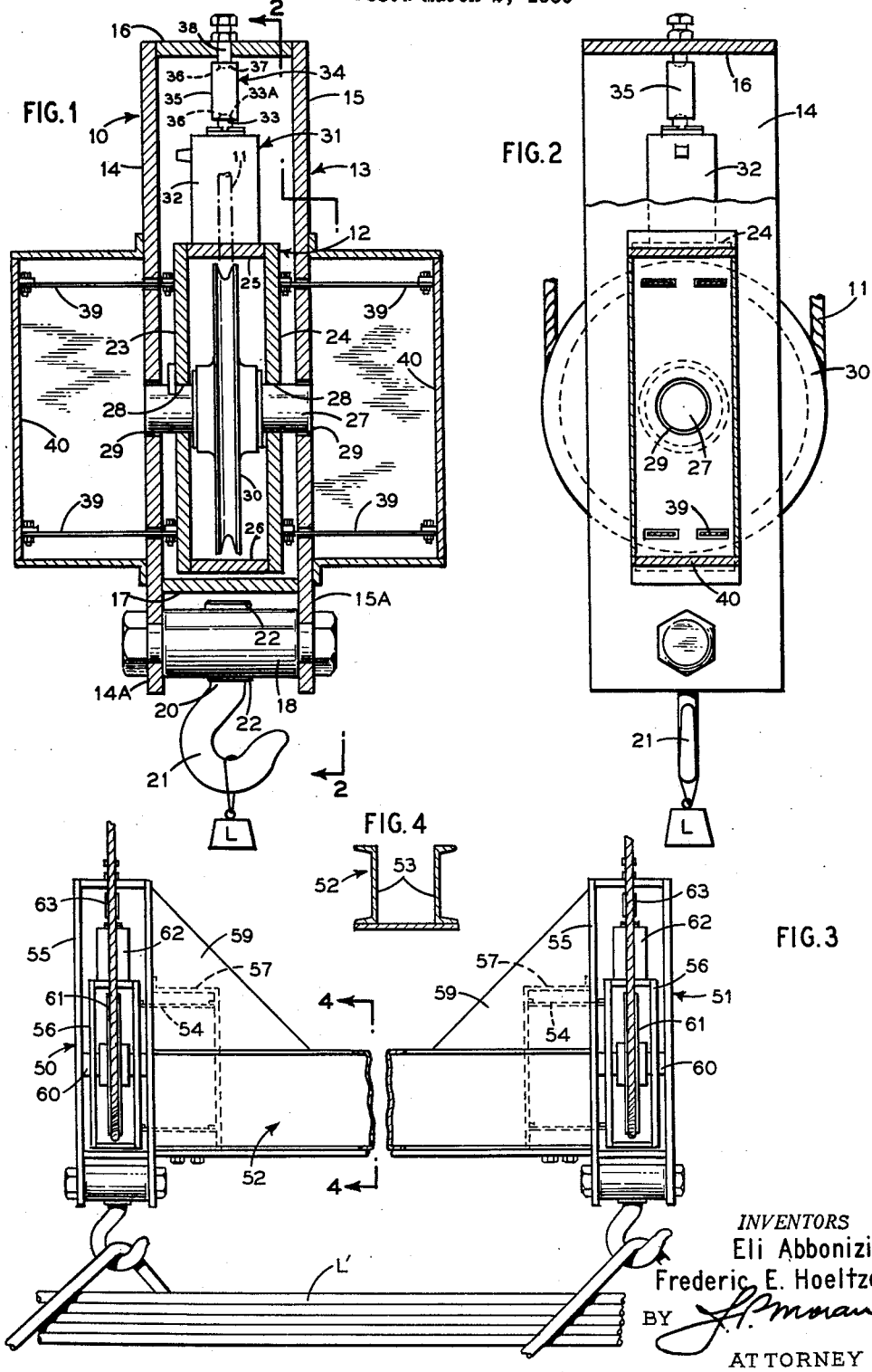
INVENTORS
Eli Abbonizio
Frederic E. Hoeltzel
BY
ATTORNEY United States Patent Office 3,080,935
Patented Mar. 12, 1963

3,080,935
HOISTING AND WEIGHING APPARATUS
Eli Abbonizio, Alliance, Ohio, and Frederick E. Hoeltzel, Plainfield, N.J., assignors to The Babcock & Wilcox Company, New York, N.Y., a corporation of New Jersey
Filed Mar. 2, 1959, Ser. No. 796,624
7 Claims. (Cl. 177—147)

This invention relates to a hoisting apparatus or crane and more particularly to a hoisting apparatus having an improved hoisting block provided with a weighing means permanently associated therewith for simultaneously performing a weighing and lifting operation. According to this invention the weighing means is operatively associated with the hoisting block in a manner so as to conserve the maximum amount of available lift or headroom for any given crane or hoist installation with which this invention is employed.

While the use of a hoisting apparatus capable of performing a simultaneous lifting and weighing operation is not, per se, new or novel, heretofore the commercially available equipment for performing the weighing operation consisted of an attachment, equipped with hooks at top and bottom, which was interposed between the existing crane hook and the load to be lifted and weighed. Such an arrangement decreased the available headroom or lifting height of an existing installation by the overall length of such an attachment. In many existing installations wherein the available headroom or lifting room is critical and permanent, the loss of any of the available headroom cannot be tolerated. Therefore, weighing attachments, heretofore available, for use with cranes operating with restricted lifting or headroom were unsatisfactory.

It is an object of this invention to provide an improved hoisting block with a weighing means formed integral therewith and arranged so as to not decrease the available headroom of an existing hoisting apparatus utilizing the same.

The foregoing object and other features and advantages of this invention are attained by a hoisting block comprising essentially of inner and outer sheave housings connected for relative movement with respect to one another when a load is lifted, one of the housings being provided with means for supporting the load and the other housing being arranged with means for resisting the weight of the load, a weighing means disposed between the housing for weighing the load by measuring the compressive forces transmitted to said weighing means by the relative movement of the sheave housings when a load is lifted and means for insuring that only the substantially axial or vertical component of the compressive forces is transmitted to the weighing means.

A feature of this invention resides in utilizing a ball and socket loading column for transmitting the compressive forces exerted by relative movement of the housings axially or vertically to a compact compressive load cell which is disposed between the housings for translating a change in force into electrical energy.

Another feature of this invention resides in the provision of stay plates which permit relative axial movement between the housings while restraining relative lateral movement therebetween.

Other features and advantages will be apparent when considered in view of the drawings and specification in which:

FIG. 1 is a sectional view in elevation of the improved hoisting block of this invention.

FIG. 2 is a sectional view taken along line 2—2 of FIG. 1.

FIG. 3 is a front elevation view of a modified form of the invention as it is utilized in conjunction with a spreader bar.

FIG. 4 is a sectional view taken along line 4—4 of FIG. 3.

Referring to the drawings, and particularly to FIG. 1, there is shown in accordance with this invention, an improved hoisting block 10 for simultaneously lifting and weighing a load L. The block 10 is swung or supported for movement between a raised and lowered position by suitable hoisting cable means 11 carried by an overhead traveling crane or hoist and the like (not shown).

Essentially the improved block 10 comprises an inner sheave housing 12 disposed within and connected to an outer sheave housing 13 so as to provide for relative movement therebetween when a load is lifted. The outer sheave housing 13 consists essentially of rectangularly disposed plate members, i.e., having opposed side members 14, 15 connected by top and bottom members 16, 17, respectively. Portions 14A, 15A of each side member extend below the bottom member 17 and support therebetween a bar or stud 18. The stud 18 between its supported ends is provided with an aperture for loosely receiving the stem portion 20 of a lifting or sling hook 21, and suitable means, such as flanges 22 are provided for rotatably securing the hook 21 in stud 18.

The inner sheave housing 12, likewise, is formed of opposed side members 23, 24 connected by transversely extending top and bottom members 25, 26. As shown, the relatively smaller inner housing 12 is disposed within the outer housing 13 and is connected thereto by a shaft 27 extending through aligned openings 28 and 29 located in the respective side members of housings 12, 13. Relative movement between the inner and outer housings 12 and 13 is attained by forming the aligned openings in the side members of one of the housings larger than the diameter of the shaft. In the illustrated embodiment the aligned openings 29 in the side members 14, 15 of the outer housing 13 are shown enlarged to permit relative movement of the shaft 27 therein.

A sheave 30 about which the hoisting cable 11 is threaded for supporting the block, is rotatably mounted on the shaft 27 within the inner housing 12. Thus it will be noted that with the arrangement described the opposing forces of the weight acting on the outer housing and the cable resisting the load acting on the inner housing results in a limited relative movement between the housings 12 and 13 when a load is lifted.

According to this invention a means 31 is disposed between the inner and outer housings 12, 13 to measure the relative compressive forces imparted to the block by the load L and the cable 11 resisting the same and ultimately translates the change into units of weight. As shown the weighing means 31 is positioned above the sheave 30 and between the corresponding top members 25, 16 of the inner and outer housings 12, 13 so as to not materially interfere or reduce the available head or lifting room of an existing crane environment.

The weighing means 31 consist of essentially a compact compression type load cell 32 incorporating a strain gauge which translates changes in force into changes in electrical energy. Any of the well known compression load cells may be employed as for example, a Baldwin type load cell as disclosed in the Baldwin-Lima-Hamilton Corp. Bulletin #338 dated 1952. Generally these load cells include a highly sensitive loading column having a loading button 33 upon which the compressive forces produced by the relative movement of the housings are transmitted.

As a strain gauge incorporated in load cells is very sensitive to changes in force, it is essential that only the substantially axial components of compressive forces resulting by relative movement of the housings in lifting a load be transmitted to the loading button 33 of the cell 32. Accordingly, this is attained by loading column assembly 34 which is disposed between the loading button 33 of the cell and the top member 16 of the outer housing 13. As shown the loading column assembly 34 includes a rod 35 having hemispherical recesses 36 disposed in each end thereof, one end engaging the hemispherical surface 33A of the loading button and the other recessed and engaging the hemispherical end 37 of a locking screw 38. Thus a ball and socket joint is had at either end of the rod 35 which insures that any horizontal component of the compressive forces applied at the top of the load cell is minimized. Consequently, any induced error resulting therefrom is all but eliminated.

Means are further provided to prohibit relative lateral movement between the housings 12, 13 and thereby substantially eliminate any horizontal force component, resulting therefrom. Securing the inner housing 12 against relative lateral movement with respect to the outer housing 13 are a plurality of stay plates 39 which extend between the inner housing 12 and brackets 40 disposed on either side of the outer housing 13. As shown, two pairs of stay plates 39 vertically spaced, are arranged on either side of the inner housing. Accordingly the stay plates 39 are each arranged and proportioned so that they will flex in a vertical direction only to accommodate for the small vertical motion between the inner housing and outer housing, due to the compressibility of the load cell. On the other hand the stay plates 39 are extremely stiff in lateral direction, thus preventing any substantial side thrust and resulting lateral force component which would otherwise induce error in the strain gauge.

In operation the load is transmitted from the sling hook 21 to the outer housing 13. It is then transmitted to the load call 32 through the ball and socket joints at the top and bottom of the cylindrical loading column 35. The load cell 32 resting on top of the inner sheave housing 12 transmits the load to the sheave shaft 27. From the shaft 27 the load is transmitted to the cable sheave 30 and in turn to the cable 11 supporting the sheave from above.

FIG. 3 is directed to a modified form of the invention. In this form a pair of hoisting blocks 50, 51, substantially as herein described, are utilized in conjunction with a spreader bar 52 whereby the load L supported thereby is divided between each block. In this form the spreader bar 52 includes essentially a pair of spaced, back to back, channel members 53. Connected to each of the channels 53 are hoisting blocks 50, 51 which are each substantially identical in structure and operation as hereinbefore described. In this form, the hoisting blocks 50, 51 differ only in that stay plates 54 are disposed only on one side of each of the outer housings 55 of blocks 50, 51, and the stay plate bracket 57 disposed within the space formed between channels. Reinforcing gussets 59 are provided in this arrangement. In all other respects the outer and inner housings 55, 56, respectively, shafts 60, sheaves 61, load cells 62 and loading column assemblies 63 for each block 50, 51, are arranged and constructed as herein described.

From the foregoing description it will be noted that the instant constructions are relatively simple in structure, inexpensive to manufacture and positive in operation. The resulting structures are readily adapted for use either on new or existing crane installations and the instant invention is of particular importance where available headroom is critical in that simultaneous lifting and weighing operations can be performed without a loss of any of the vital headroom.

While the instant invention has been disclosed with reference to a particular embodiment thereof, it is to be appreciated that the invention is not to be taken as limited to all of the details thereof as modifications and variations thereof may be made without departing from the spirit or scope of the invention.

What is claimed is:
1. A device for simultaneously lifting and weighing a load comprising an outer housing having means connected thereto for supporting a load, an inner housing, a shaft interconnecting said housings, said shaft having a sheave rotatably connected thereto, said inner housing and sheave being physically disposed within said outer housing and movable relative thereto, a hoisting cable passing about said sheave for resisting the weight of the load to be lifted, weighing means disposed between said outer and inner housings above said sheave and within said outer housing for weighing the load by measuring the compressive forces transmitted to said weighing means by relative movement of said housings when a load is lifted and means disposed on said outer housing for restraining relative movement between said housing, said restraining means including stay plates connected between said housings whereby said stay plates flex in a vertical plane only so that only substantially axial components of the compressive forces are transmitted to said weighing means.

2. A device for simultaneously lifting and weighing a load comprising an outer housing having means connected thereto for supporting a load, an inner housing physically disposed within and spaced from said outer housing, said housings being connected to provide relative movement therebetween when a load is lifted, hoisting means connected with said inner housing for resisting the weight of the load, means disposed between said inner and outer housings for weighing the load by measuring the compressive forces transmitted to said weighing means by the relative movement of said housings when a load is lifted, and means for restraining relative lateral movement between said inner and outer housings, said restraining means includes a bracket connected to the outer housing, and a stay plate adapted to flex in a vertical plane connected between said bracket and said inner housing so that only the substantially axial component of said compressive forces are transmitted to said weighing means.

3. A device for simultaneously lifting and weighing a load comprising opposed side, top and bottom members forming an opened end outer housing, means connected to said outer housing for supporting a load, an open end inner housing having opposed side, top and bottom members corresponding to the opposed side, top and bottom members of said outer housing said inner housing being disposed within and spaced from said outer housing, said opposed side members of said inner and outer housings having aligned openings therein, a shaft extending through said openings, the openings in the side members of said outer housing being larger than the diameter of said shaft so as to accommodate for relative movement between said housing when a load is lifted, a sheave rotatably mounted on said shaft within said inner housing, a hoisting cable threaded about said sheave for resisting the weight of the load to be lifted, means disposed between and connected to the corresponding top members of said inner and outer housing for weighing the load by measuring the compressive forces transmitted to said weighing means by the relative movement of said housing when a load is lifted, a means disposed on one side of said outer housing for restraining relative lateral movement between said housings, said restraining means including a bracket connected to the side member of the outer housing, and a stay plate adapted to flex in a vertical plane connected between said bracket and the side member of said inner housing so that only the substantially axial components of the compressive forces are transmitted to said weighing means.

4. A device for simultaneously lifting and weighing a load comprising opposed side, top and bottom members forming an opened end outer housing, means connected to said outer housing for supporting a load, an opened end inner housing having opposed side, top and bottom members corresponding to the opposed side top and bottom members of said outer housing disposed within and spaced from said outer housing, said opposed side members of said inner and outer housings having aligned openings therein, a shaft extending through said openings, the openings in the side members of said outer housing being larger than the diameter of said shaft so as to accommodate relative movement between said housing when a load is lifted, a sheave rotatably mounted on said shaft within said inner housing, a cable threaded about said sheave for resisting the weight of the load to be lifted, means disposed between the corresponding top members of said inner and outer housing for weighing the load by measuring the compressive forces transmitted to said weighing means by the relative movement of said housings when a load is lifted, said weighing means including a compression loading cell which translates a change in force into electrical energy, said cell being disposed between the top members of said inner and outer housings, and a ball and socket loading column disposed between the top member of said outer housing and said cell, a means for restraining relative lateral movement between said housings so that only the substantially axial components of the compressive forces are transmitted to said weighing means through said ball and socket loading column, said restraining means comprising a bracket connected to a side member of said outer housing and stay plates connected to said bracket and corresponding side member of said inner housing, said stay plates being proportioned so as to allow relative axial movement between said housings and to resist relative lateral movement therebetween.

5. A device for simultaneously lifting and weighing a load comprising opposed side, top and bottom members forming an opened end outer housing, means connected to said outer housing for supporting a load, an opened end inner housing having opposed side, top and bottom members corresponding to the opposed side top and bottom members of said outer housing disposed within and spaced from said outer housing, said opposed side members of said inner and outer housings having aligned openings therein, a shaft extending through said openings, the openings in the side members of said outer housing being larger than the diameter of said shaft so as to accommodate relative movement between said housing when a load is lifted, a sheave rotatably mounted on said shaft within said inner housing, a hoisting cable threaded about said sheave for resisting the weight of the load to be lifted, means disposed between and connected to the corresponding top members of said inner and outer housing for weighing the load by measuring the compressive forces transmitted to said weighing means by the relative movement of said housings when a load is lifted, a means disposed on both sides of said outer housing for restraining relative lateral movement between said inner and outer housings so that only the substantially axial components of the compressive forces are transmitted to said weighing means.

6. A device for simultaneously lifting and weighing a load comprising an outer housing having means connected thereto for supporting a load, an inner housing disposed within and spaced from said outer housing, a shaft interconnecting said housings so as to render said housings vertically movable relative to each other, hoisting means including a sheave rotatably mounted on said shaft within said inner housing for resisting the weight of the load to be lifted, weighing means disposed between the outer and inner housing for weighing the load by measuring the compressive forces transmitted to the weighing means by relative movement between said inner and outer housings when a load is lifted, and means mounted on said outer housing for restraining relative lateral movement between said inner and outer housings so that only substantially axial components of the compressive forces are transmitted to the weighing means.

7. A device for simultaneously lifting and weighing a load comprising an outer housing having means connected thereto for supporting a load, an inner housing disposed within and spaced from said outer housing, a shaft interconnecting said housings so as to render said housings vertically movable relative to each other, hoisting means including a sheave rotatably mounted on said shaft within said inner housing for resisting the weight of the load to be lifted, weighing means disposed between the outer and inner housing for weighing the load by measuring the forces transmitted to the weighing means by relative movement between said inner and outer housings when a load is lifted, and means mounted on said outer housing for restraining relative lateral movement between said inner and outer housings so that only substantially axial components of the forces are transmitted to the weighing means.

References Cited in the file of this patent
UNITED STATES PATENTS

| | | |
|---|---|---|
| 2,054,447 | Ross | Sept. 15, 1936 |
| 2,183,078 | Kemler | Dec. 12, 1939 |
| 2,820,624 | Koegel | Jan. 21, 1958 |